(12) United States Patent (10) Patent No.: US 8,832,304 B2
Traynor (45) Date of Patent: Sep. 9, 2014

(54) PROTOCOL AGNOSTIC NOTIFICATION SYSTEM

(75) Inventor: Christopher J. Traynor, Lebanon, NJ (US)

(73) Assignee: IPC Systems, Inc., Jersey City, NJ (US)

( * ) Notice: Subject to any disclaimer, the term of this patent is extended or adjusted under 35 U.S.C. 154(b) by 187 days.

(21) Appl. No.: 13/177,882

(22) Filed: Jul. 7, 2011

(65) Prior Publication Data

US 2013/0013804 A1   Jan. 10, 2013

(51) Int. Cl.
*G06F 15/16* (2006.01)
*H04L 29/08* (2006.01)
*H04L 12/58* (2006.01)
*H04L 12/18* (2006.01)

(52) U.S. Cl.
CPC ............ *H04L 67/26* (2013.01); *H04L 12/5835* (2013.01); *H04L 12/1859* (2013.01)
USPC ............................. 709/232; 709/206; 719/318

(58) Field of Classification Search
CPC .. H04L 67/26; H04L 12/1859; H04L 12/5835
USPC ........... 455/411; 370/261, 389; 719/331, 318; 709/224, 226, 200–211, 227–237; 713/169; 705/40, 26.81; 715/200–277; 717/100–135
See application file for complete search history.

(56) References Cited

U.S. PATENT DOCUMENTS

| | | | | |
|---|---|---|---|---|
| 6,385,595 | B1 * | 5/2002 | Kolling et al. | 705/40 |
| 6,629,138 | B1 * | 9/2003 | Lambert et al. | 709/224 |
| 6,865,742 | B1 * | 3/2005 | Khare et al. | 719/331 |
| 7,590,563 | B1 * | 9/2009 | Ward et al. | 705/26.81 |
| 2002/0112058 | A1 * | 8/2002 | Weisman et al. | 709/227 |
| 2002/0120685 | A1 * | 8/2002 | Srivastava et al. | 709/203 |
| 2002/0143819 | A1 * | 10/2002 | Han et al. | 707/513 |
| 2004/0001446 | A1 * | 1/2004 | Bhatia et al. | 370/261 |
| 2006/0195473 | A1 * | 8/2006 | Lin et al. | 707/104.1 |
| 2007/0209032 | A1 * | 9/2007 | Mihai et al. | 717/126 |
| 2007/0239987 | A1 | 10/2007 | Hoole et al. | 713/169 |
| 2010/0202450 | A1 * | 8/2010 | Ansari et al. | 370/389 |
| 2010/0216430 | A1 * | 8/2010 | Brown et al. | 455/411 |
| 2011/0258263 | A1 * | 10/2011 | Murthy et al. | 709/206 |

OTHER PUBLICATIONS

Jeff Barr, *Introducing the Amazon Simple Notification Service*, Amazon Web Services Blog, http://aws.typepad.com/aws/2010/04/introducing-the-amazon-simple-notification-service.html (last visited Jan. 31, 2012).
*Amazon Simple Notification Service (Amazon SNS)*, Amazon Web Services, http://aws.amazon.com/sns/ (last visited Jan. 31, 2012).

* cited by examiner

*Primary Examiner* — Wing F Chan
*Assistant Examiner* — Raji Krishnan
(74) *Attorney, Agent, or Firm* — Fitzpatrick, Cella, Harper & Scinto (57) ABSTRACT

Subscription notifications are provided by receiving a request from a subscriber to register a subscription, the request identifying (i) a topic, (ii) a protocol corresponding to a first adaptor and supported by the subscriber, and (iii) a parameter associated with the protocol. The request is validated based on the parameter, and subscription data is stored. The subscription data is organized as a hierarchical data structure including a plurality of topics and sub-topics, each of the topics and sub-topics being associated with one or more subscribers and adaptors. A message to be published for a topic is received from a publisher. A plurality of adaptors, which correspond to a plurality of protocols, respectively, to be used for the topic is identified in the subscription data. A plurality of notifications corresponding to the message is published by the plurality of adaptors using the plurality of protocols, respectively.

18 Claims, 4 Drawing Sheets

PROTOCOL AGNOSTIC NOTIFICATION SYSTEM

BACKGROUND

I. Field

Example aspects of the present invention generally relate to private line communication systems, and more particularly to an event signaling framework that is adaptable to, and independent of, both incoming and outgoing protocols.

II. Related Art

Typical notification systems deliver messages to a set of recipients by sending an electronic communication when a new topic has been added to an application, a status has changed, or an event has occurred. Certain computer and telecommunications applications implement notification services to provide a status indicator that conveys ability and willingness of a potential communication partner to communicate. This status indicator is sometimes referred to as a "presence indicator." The topic of presence is provided via a network connection to a presence service in the form of presence information (or presence state), which can be made available for distribution to users or clients on a network to convey availability for communication.

Notification topics have a wide application in many communication services. A turret system, for example, is a specialized telephony switching system that allows a relatively small number of users to access a large number of external lines and provides enhanced communication features such as hoot-n-holler, push-to-talk, intercom, video and large-scale conferencing. These features are often utilized in the financial industry such as trading floor environments, as well as security/law enforcement, utilities, healthcare, and customer support (e.g. contact centers) environments. Users interface with a turret system through a turret device, which is a phone-like desktop device with multiple handsets and speakers and multiple buttons.

A turret is either implemented in dedicated hardware (sometimes referred to as a "hard" turret) or general-purpose computer (sometimes referred to as a "soft" turret). With the advent of Voice over Internet Protocol ("VoIP"), VoIP turret devices have moved from a fixed environment of dedicated voice communications trading resources to a more virtualized trading environment across multiple sites. This virtual environment allows resources to be shared dynamically, when and where required, across a global corporate enterprise.

U.S. patent application Ser. No. 11/943,800, entitled "Systems, Methods, Apparatus and Computer Program Products for Sharing Resources Between Turret Systems and PBXs Using SIP", incorporated herein by reference in it is entirety, provides an advanced interface which allows sharing of resources across two telephony/switching systems without the need for custom, non-standardized, vendor-specific computer telephony integration ("CTI") solutions. Resources across a turret system and a telephone exchange are shared using an agent which registers into the telephone exchange as a predetermined device and to receive a state change notification of a resource from at least one of the telephone exchange and the turret system. Receipt of the state change notification causes the agent to change a state of a corresponding resource.

One technical challenge is in providing state change notifications in a manner that is adaptable to, and independent of, both the incoming and outgoing protocols. Another technical challenge involves providing notifications within a private line communications system environment without the need for dedicated notification servers.

BRIEF DESCRIPTION

The example embodiments described herein meet the above-identified needs by providing a methods, systems and non-transitory computer-readable medium products for providing subscription notifications by receiving, by a registrar, a request to register a subscription, determining an adaptor to associate with the subscription based on a protocol, and publishing, by the adaptor, a notification based on the subscription.

In another example aspect, a determination is made whether the adaptor was used prior to the request and the adaptor corresponding to the request is dynamically loaded if a determination is made that the adaptor has not been used prior to the request.

In yet another aspect, the adaptor validates the request to register the subscription and if a determination is made that the subscription data is valid, the subscription is stored as subscription data.

In another example aspect, a publisher receives a request to communicate a notification and a notifier is requested to provide an identification of the adaptor. The publisher, in turn, invokes a call to the adaptor to communicate the notification.

The subscription can include a designation of a topic, a destination of a subscriber for the topic, and a designation of the adapter.

The adaptor can be one of a plurality of adaptors, where each adaptor is associated with a distinct protocol. In another example aspect subscriptions are associated with each adaptor.

BRIEF DESCRIPTION OF THE DRAWINGS

The features and advantages of the present invention will become more apparent from the detailed description set forth below when taken in conjunction with the drawings.

DETAILED DESCRIPTION

The present invention is directed to a system, method and computer-readable medium for providing a universal event signaling framework that is adaptable to, and independent of, both the incoming and outgoing protocols. Clients of the framework can utilize multiple, extensible protocols to subscribe to future events such as Hypertext Transfer Protocol (HTTP), Session Initiation Protocol (SIP), and the like, by direct invocation. A publishing Application Programming Interface (API) allows for event signaling to be initiated over multiple protocols.

Subscriptions can be dynamically bound to an extendable set of outbound protocols such as Java Naming and Directory Interface (JNDI), SIP and HTTP, and the like. This allows for varied languages, remote systems and local clients to share in a universal event notification experience and without the need for fixed boundaries of support or modification to the core functionality of either the notification system itself or the system or service which generates or receives the notifications.

Formats used to publish frequently updated works also can be incorporated into the framework without modification to the core functionality. For example, extensions utilizing Really Simple Syndication (RSS) formats, Simple Network Management Protocol (SNMP) and standards for logging program messages such as syslog can be added as necessary.

Figure 1:
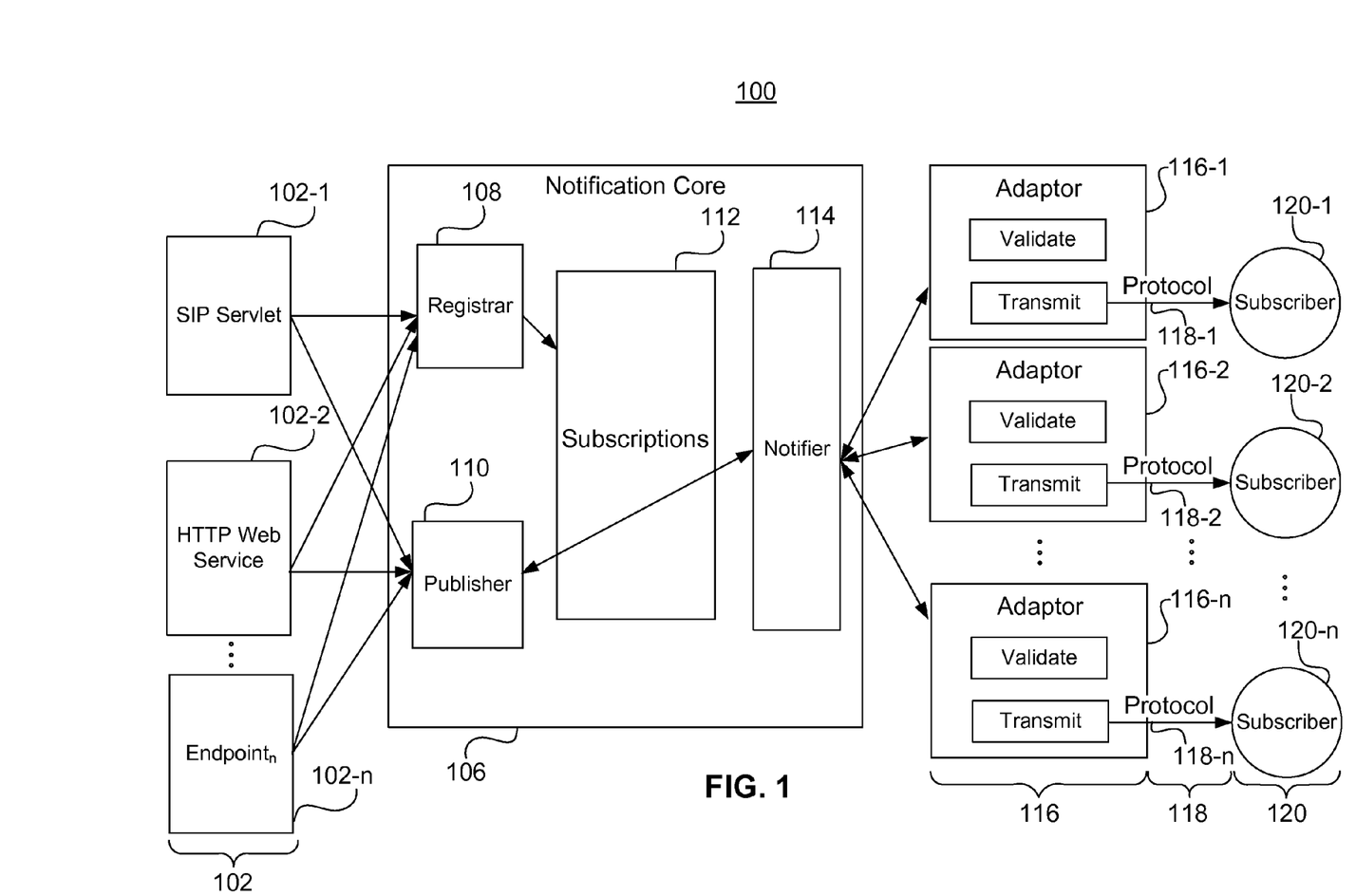
FIG. 1 is a diagram of a notification system according to one embodiment of the present invention.

FIG. 1 is a diagram of a notification system 100 according to one embodiment. As shown in FIG. 1, notification system 100 includes endpoints 102-1, 102-2, ... 102-n individually and collectively sometimes referred to as 102), a notification core 106, adaptors 116-1, 116-2, ..., 116-n (individually and collectively sometimes referred to as 116), and subscribers 120-1, 120-2, ..., 120-n (individually and collectively sometimes referred to as 120).

Generally, notification system 100 provides a mechanism to register a subscription for future notifications on a topic and publishes the notifications. Endpoints 102 are protocol endpoints which communicate over an external protocol to notification core 106 and can be incorporated programmatically using, for example, a SIP Servlet 102-1, an HTTP Web Service 102-2, and the like.

Notification core 106 includes a registrar 108, a publisher 110, subscriptions data 112 and a notifier 114. Adaptors 116-1, 116-2, ..., 116-n are constructed to validate and transmit content to subscribers 120-1, 120-2, ..., 120-n according to a protocol 118-1, 118-2, ..., 118-n and according to one or more subscription(s) associated with each subscriber 120. The terms "adaptor" and "adapter," and/or the plural versions of those terms, may be used interchangeably herein.

One or more endpoints 102, registrar 108 and subscriptions data 112 are used to register a subscription on a particular topic. Generally, subscriptions data 112 are data organized as data structures (e.g., in a memory) which are used to manage which subscribers have registered to receive notifications related to particular subscriptions. Subscriptions data 112 are also used to identify which groups of adapters 116 are associated with a given subscription and any values of parameters required by the adapters to communicate the notifications over a corresponding protocol 118. Storing subscriptions data 112 in memory allows a particular topic published such that subscriptions relevant to the topic can be rapidly found and organized by adaptor 116 and delivered in groups based on adaptor 116.

In one example embodiment, subscriptions data 112 are data structures organized as an ordered tree. Each data structure, also referred to as a "trie", can be organized hierarchically.

For example, news subscriptions can be organized as tree nodes ".news." and tree sub-nodes (e.g., ".news.weather."). When a publish occurs on only the topic ".news.", the data structure is searched for the topic ".news." and publications are made to all the subscriptions under the topic ".news." in the tree. Similarly when a publish occurs on the sub-topic ".news.weather", the data structure is searched for the sub-topic ".news.weather" and publications are made to all the subscriptions under that sub-topic in the tree.

This organizational structure thus allows index searches on partial matches to be organized by adapter 116. Different subscribers (also referred to as clients or users) can be subscribed to the same topic, where each subscriber has a different adapter, e.g., one having a SIP adapter and the other having an HTTP adapter. The topics within a tree can further be organized by adaptors 116. For example, a tree node corresponding to the topic (e.g., .news.) can further have a list of items identifying associated adapters. As subscriptions are added to the tree structure, they can be obtained on an adapter basis and handed off in bulk to respective adapters 116.

It should be understood that the subscriptions can be organized in a variety of different ways and that the above-described tree organization implementation is exemplary. For example, subscriptions can be organized by using a file, a database, memory stores, hash tables, other types of trees, and the like.

A request to register a subscription is communicated to registrar 108 through an interface, which in one embodiment is provided as a Java API. Particularly, the request to register is communicated through a Java API at the registrar 108 directly, or through an endpoint 102, e.g. SIP Servlet 102-1, HTTP Web Service 102-2.

In a case where the request to register is delivered by SIP Servlet 102-1 or HTTP Web Service 102-2, a message carrying the request to register the subscription is forwarded over an external protocol to the Java API at the registrar 108. In this case, endpoints 102 (e.g., SIP Servlet 102-1 and HTTP Web Service 102-2) act as protocol end-points. Upon reception of the request for a new topic subscription by registrar 108, notification core 106 stores that subscription as subscriptions data 112. Other topics corresponding to different applications or systems may be stored as subscription data 112 as well.

Thus, subscription data 112 contain a topic, a designation of adaptor(s) 116 that will ultimately deliver notifications on its behalf, as well as values of any parameters that adaptor(s) 116 use to make the delivery. Example parameters include an IP address, a port, a Uniform Resource Locator (URL) or other information related to the protocol that the chosen adaptor 116 operates over.

Notification system 100 allows for any number of adaptors 116 to be added and associated to a particular subscription. Example adaptors support HTTP, SIP, direct Java callback invocation, Java Naming and Directory Interface (JNDI), Simple Network Management Protocol (SNMP), RSS and the like.

Endpoints 102, publisher 110, subscriptions data 112, notifier 114, adapters 116 and subscribers 120 are used for publishing a notification. Publishing a notification can be achieved directly through a Java API or through an endpoint 102, e.g. through SIP Servlet 102-1 or HTTP Web Service 102-2. As is the case with registering a subscription, an endpoint 102 forwards the incoming request to publish a topic over an external protocol to the Java API. In one embodiment, publisher 110 has an interface provided as a Java API. When publisher 110 receives a request to publish, it collects all subscriptions that exist for the given topic with the subscriptions data 112 and provides them to notifier 114. Notifier 114 organizes subscriptions with respect to corresponding adaptors 116. Subsequently, notifier 114 provides each adaptor 116 responsible for a subscription with a notification of the published topic.

In one embodiment, each adaptor 116 is given the set of subscriptions that are relevant for the topic at one time to carry out the notification across all subscriptions all at once. This provision, referred to as "multi-casting" allows for greater performance for those protocols that are multicast capable. Once the subscriptions for a given adaptor 116 are delivered, adaptor 116 makes notifications to subscribers 120 over its supported protocol 118.

In an optional embodiment, an adaptor 116 is provided with instructions as to when to deliver a particularly publication, by notifier 114 or by a subscriber 120.

FIG. 1 depicts subscribers 120-1, 120-2, ..., 120-n associated with respective adapters 116-1, 116-2, ..., 116-n. It should be understood, however, that there can be many subscribers for a given topic and a particular adaptor 116. A given topic notification, itself, may be spread across many adaptors 116 as well. This provides the ability to publish and subscribe generically with reception and delivery of subscriptions and topics over an adaptable set of protocols. The notification behavior is, therefore, protocol agnostic.

Figure 2:
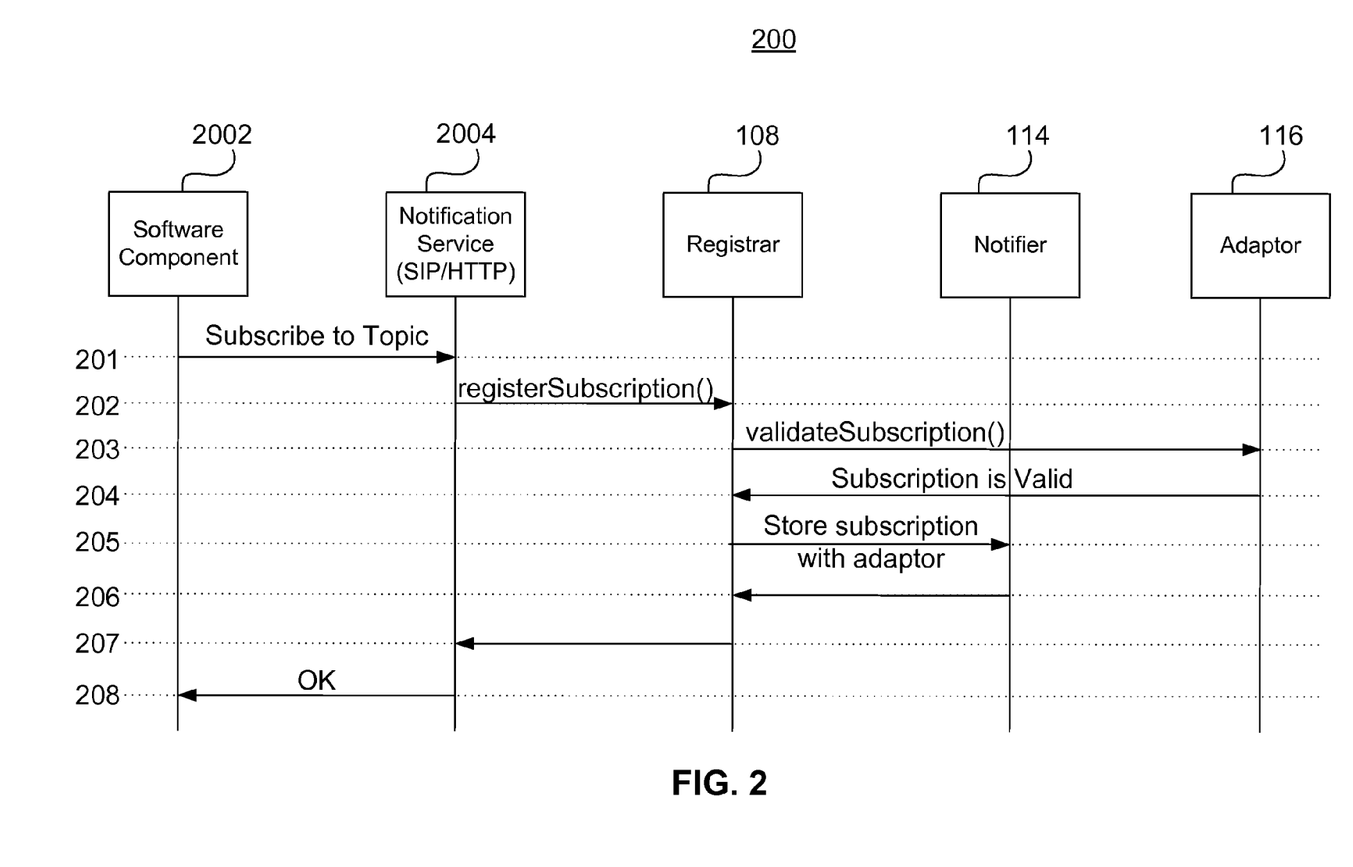
FIG. 2 is a flowchart illustrating a subscription process according to one embodiment of the present invention.

FIG. 2 is a flowchart illustrating a subscription process according to one embodiment of the present invention. In step 201, a software component 2002 in communication with the notification system communicates for the purpose of subscribing or publishing. Software component 2002 can reside in the same application that links the notification system or can be remote in which case it would use an endpoint 102, such as SIP or HTTP endpoints (102-1, 102-2) to communicate with the notification framework. Shown in FIG. 2 is a notification service 2004, which is the amalgam of endpoints 102 detailed above with respect to FIG. 1 (e.g. SIP servlet 102-1, HTTP Web Service 102-2, etc.).

In one embodiment, software components 2002 making subscription requests are external to the notification system 100 running within an application, such as a J2EE web application. Requests for subscriptions for components running in the same virtual machine (e.g. a Java virtual machine) can be made directly to the registrar 108.

In step 202, notification service 2004 processes the data for the subscription request by making a call on the registrar 108, e.g. registerSubscription( ), requesting registrar 108 to store the subscription as subscription data 112. Registrar 108, in turn, inspects the subscription information received from notification service 2004, and determines the adaptor 116 which will communicate the notification corresponding to the subscription. If there are no subscribers, then the registrar need not do anything.

In one embodiment, registrar 108 dynamically loads the adaptor 116 if it has not previously been used. If an adaptor has subscriptions, then it will have been loaded as the first subscription is requested. Thus, even if an adaptor 116 of a certain type is available, the notification system need not dynamically load it unless required. In one example embodiment, dynamically loading the adaptor 116 loads all the necessary libraries (or binaries) into a memory, associates all necessary addresses of functions and variables contained in the library(ies) to be retrieved, and executes those functions or accesses those variables necessary to communicate a notification associated with the subscriptions when instructed to do so.

Once registrar 108 has determined which adaptor 116 will communicate the notification, registrar 108, in step 203, requests adaptor 116 to validate that the subscription has all of the parameters required to later make a notification on its behalf. The request to validate is performed by making a call, e.g. validateSubscription( ), to the appropriate adaptor 116.

In step 204, adaptor 116 responds with an indication as to whether the subscription is valid for later use during publishing by communicating a response back to registrar 108, e.g. "Subscription is Valid". If the subscription passes validation, registrar 108 requests notifier 114 to store the subscription in subscriptions data 112 as a new registration, as shown in step 205. A response (e.g. "OK") is communicated to software component 2002, indicating that the subscription has been registered, as shown in steps 206, 207 and 208. At this point, future publications on the subscription's respective topic will be delivered to its intended recipient through the appropriate adaptor 116, as designated within subscription data 112.

Registrar 108 is also responsible for deregistering subscriptions for a given topic. The process of deregistering a subscription is similar to registering a subscription described above with respect to FIG. 2. Instead of subscribing to a topic, software component 2002 communicates a request to unsubscribe a topic. Notification service 2004, in turn, communicates to registrar 108 a call to unregister the subscription, e.g., unregisterSubscription( ) (not shown). Registrar 108 then removes the subscription from subscription data 112. It is not necessary to validate a subscription when it is being unregistered.

Figure 3:
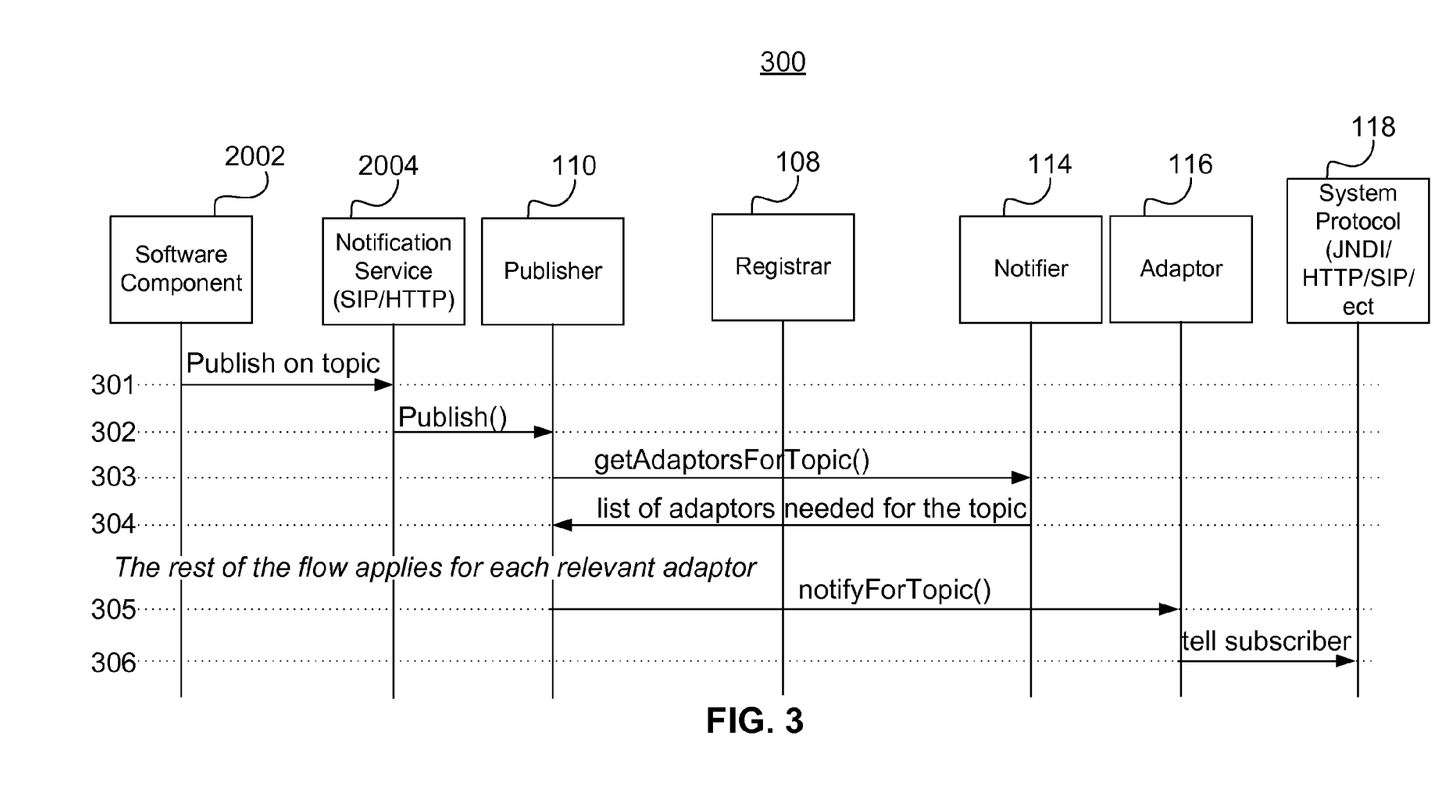
FIG. 3 is a flowchart illustrating a publishing process according to one embodiment of the present invention.

FIG. 3 is a flowchart illustrating a publishing process according to one embodiment of the present invention. At step 301, software component 2002 makes a notification on a topic by communicating subscription information to notification service 2004. Notification service 2004, at step 302, calls upon publisher 110 to publish the notification, e.g. Publish( ).

Next the set of adaptors 116 needed to complete the publishing request are determined Particularly, at step 303, publisher 110 retrieves adaptors 116 associated with registered subscriptions for a topic by making a call upon notifier 114, e.g. getAdaptorsForTopic( ). In one embodiment, the associations of adaptors to subscriptions can be stored in an internal data structure. Upon retrieving the distinct set of adaptors, notifier 114 communicates the set to the publisher 110, as shown in step 304. In step 305, publisher 110 collects the subscriptions for relevant adaptors 116 and invokes a call to provide each adaptor 116 a set of subscriptions for the topic that it is responsible for, for example, by using a call, e.g. notifyForTopic( ), on each adaptor, correspondingly. Each adaptor 116 then transmits the notifications to the subscribers it is charged with notifying over the system protocol. System protocol refers to all available protocols 118 over which adaptors 116 use to convey notifications.

A public or private line communications system can execute applications which use and generate both transitory and persistent data. Transitory (short term or temporary) data are those data that remain alive only for a relatively short time period, typically not surviving the activation or execution of an application, such as the instantiation of a call session, whereas persistent (or long term) data are those data that are stored in a storage architecture for long-term, reliable retention, such as a contact which will be accessed after a call session has ended. Thus, transient data are typically manipulated by the programming language facilities and persistent data are manipulated by a file system or a database management system (DBMS).

In high performance or real-time communications environments, each type of data may have different needs. In addition to persistent and transient storage modes, a mixed (or "hybrid") storage mode can be provided in accordance with an exemplary embodiment, referred to as "persistent high-speed".

Persistent high-speed environment information is still stored as persistent data in storage, but it can be accessed more quickly as is transient storage. This is accomplished by, for example, provisioning an intermediate cache from the transient storage.

In one embodiment, a publication is triggered by a change in transient storage. The publishing of changes related to transients is done explicitly in the API code that handles the process of saving the transient.

Notification Use Case: Button Updates. In one exemplary use case, a software package utilizing the notification system 100 provides users with facilities that are used to make up primary features of a large scale turret system. This implementation acts as a server to a set of turrets. When a user configures their turret, they can create virtual buttons within its onboard display, which are later used as shortcuts. For example, a virtual button can be used to initiate phone calls to a given counterparty. Each button on the display has a label that is used to represent who the user will be calling if they press that button. The details related to each button are stored in a database. Any changes to a button will cause a notification to be published to subscribers on that button data according to the notification procedure discussed above with respect to FIG. 3.

Turrets require a user to log in for security reasons. Each login has a "button sheet" associated with it that is a collection of button definitions that will go on its display for that user. The buttons can be edited using either the phone's menu system or via a centralized administration application. If a change is made to a button that belongs to a user that is logged in, the turret needs to reload that button data and then reflect any changes that are visible. One primary example of this use case can be seen in the updating of the label on a button. If the change is made via the administration application, the turret updates its display to reflect the new label. When the user logged into the turret, it will have subscribed to notifications related specifically to its buttons. At the point where the change in the label is saved to the database, a notification will be published that relates to the specific change (e.g., a label). The turret will receive that notification because it has subscribed to this kind of change and responded to it by loading the new button data and updating its display. This achieves the effect of awareness of and dynamic updates due to changes in button data.

Notification Use Case: Line Status & Presence. Another use case example involves line status. Line status is used to propagate changes in the status of a line, such as a line seized by a turret, to all other turrets or devices within an installation. When a user of a turret picks up the receiver, they can select a line to make a phone call from. This act is commonly referred to as "seizing a line." In one embodiment, the internal (e.g., cached) data related to the status of that line is updated. In one example implementation, a notification is published through the notification system 100 to all other subscribers. Each turret within the system subscribes to notifications related to lines that it has available to it by configuration. When a notification relating to a line status (also referred to as a "line state") change is received (e.g., that the line has been seized), each turret in the configuration will update its display of that line status in a way that alerts the user of the current state of the line. That change in display may be performed, for example, by highlighting the line, changing its color, etc.

The notification system 100 thus provides a mechanism for alerting many subscribers to a change in data. This data pertains to the state of a physical thing in the real world and the reception of a posted notification message correspondingly updates a turret's display to coincide with that change.

"Presence" updates are achieved in a similar manner. Presence is the status of a user with respect to the environment of the turret system. A user can be in a number of presence states including logged in, logged out, and on the turret. Just as is the case for line status, changes in the (e.g., in-memory) state related to a given user are propagated via the notification system. When these notifications are received by the subscribers (e.g., the turrets), the display of a current status for a given user is updated.

The example embodiments described above such as, for example, the systems and procedures depicted in or discussed in connection with FIGS. 1-3, or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 4:
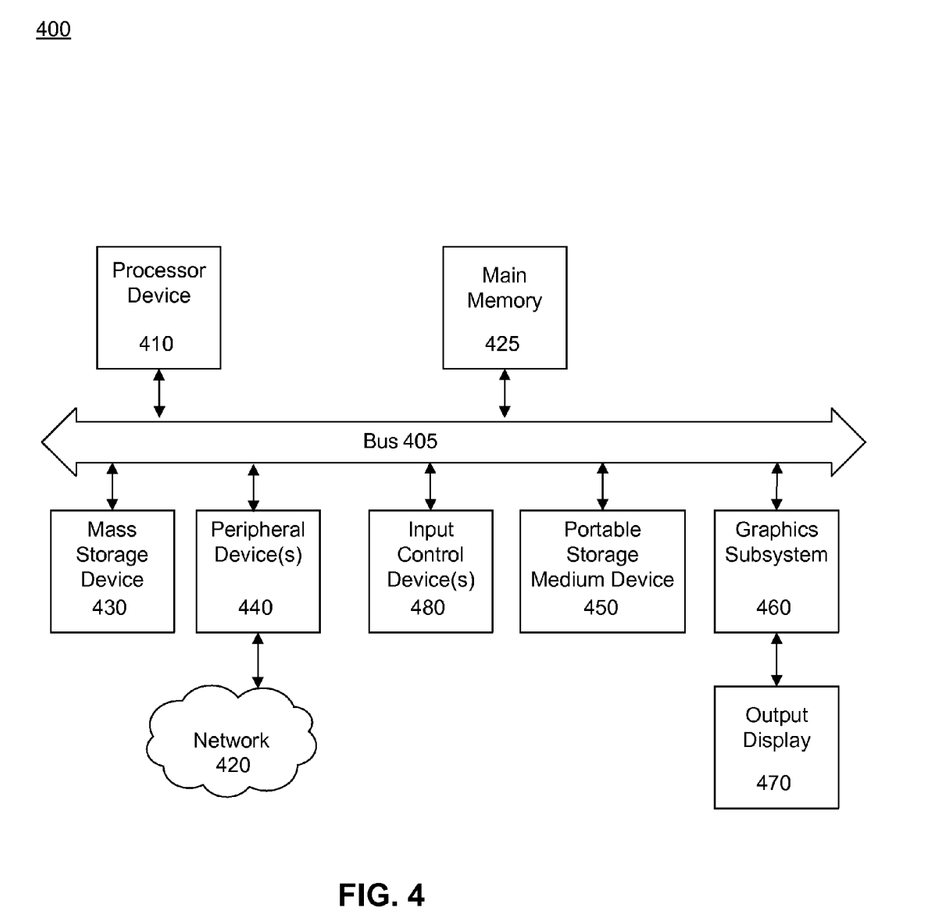
FIG. 4 is a block diagram of an exemplary computer system useful for implementing the present invention.

FIG. 4 is a block diagram of a general and/or special purpose computer 400, in accordance with some of the example embodiments of the invention. The computer 400 may be, for example, a user device, a user computer, a client computer and/or a server computer, among other things.

The computer 400 may include without limitation a processor device 610, a main memory 425, and an interconnect bus 405. The processor device 610 may include without limitation a single microprocessor, or may include a plurality of microprocessors for configuring the computer 400 as a multi-processor system. The main memory 425 stores, among other things, instructions and/or data for execution by the processor device 410. The main memory 425 may include banks of dynamic random access memory (DRAM), as well as cache memory.

The computer 400 may further include a mass storage device 430, peripheral device(s) 440, portable storage medium device(s) 450, input control device(s) 480, a graphics subsystem 460, and/or an output display 470. For explanatory purposes, all components in the computer 400 are shown in FIG. 4 as being coupled via the bus 405. However, the computer 400 is not so limited. Devices of the computer 400 may be coupled via one or more data transport means. For example, the processor device 410 and/or the main memory 425 may be coupled via a local microprocessor bus. The mass storage device 430, peripheral device(s) 440, portable storage medium device(s) 450, and/or graphics subsystem 460 may be coupled via one or more input/output (I/O) buses. The mass storage device 430 may be a nonvolatile storage device for storing data and/or instructions for use by the processor device 410. The mass storage device 430 may be implemented, for example, with a magnetic disk drive or an optical disk drive. In a software embodiment, the mass storage device 430 is configured for loading contents of the mass storage device 430 into the main memory 425.

The portable storage medium device 450 operates in conjunction with a nonvolatile portable storage medium, such as, for example, a compact disc read only memory (CD-ROM), to input and output data and code to and from the computer 400. In some embodiments, the software for storing an internal identifier in metadata may be stored on a portable storage medium, and may be inputted into the computer 400 via the portable storage medium device 450. The peripheral device(s) 440 may include any type of computer support device, such as, for example, an input/output (I/O) interface configured to add additional functionality to the computer 400. For example, the peripheral device(s) 440 may include a network interface card for interfacing the computer 400 with a network 420.

The input control device(s) 480 provide a portion of the user interface for a user of the computer 400. The input control device(s) 480 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 400 may include the graphics subsystem 460 and the output display 470. The output display 470 may include a cathode ray tube (CRT) display and/or a liquid crystal display (LCD). The graphics subsystem 460 receives textual and graphical information, and processes the information for output to the output display 470.

Each component of the computer 400 may represent a broad category of a computer component of a general and/or special purpose computer. Components of the computer 400 are not limited to the specific implementations provided here.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a non-transitory computer-readable storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD-ROM, a microdrive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for providing subscription notifications, comprising the steps of:
   using at least one processor to perform:
      receiving, by a registrar, a request from a subscriber to register a subscription, the request including (i) an identifier of a topic, (ii) an identifier of a protocol corresponding to a first adaptor and supported by the subscriber, and (iii) a parameter associated with the protocol;
      validating, by the first adaptor, the request to register the subscription based on the parameter;
      storing the subscription as subscription data, including the identifier of the topic, an identifier of the first adaptor, and the parameter, if a determination is made by the validating that the subscription data is valid, wherein the subscription data is organized as a hierarchical data structure including a plurality of topics and sub-topics, each of the topics and sub-topics being associated with one or more subscribers and adaptors;
      receiving, from a publisher, a message to be published, the message including the identifier of the topic;
      identifying, in the subscription data, a plurality of adaptors, including the first adaptor, to be used for the topic based on the identifier of the topic included in the message, wherein the plurality of adaptors corresponds to a plurality of protocols, respectively; and
      publishing, by the plurality of adaptors using the plurality of protocols, respectively, a plurality of notifications corresponding to the message.

2. The method according to claim 1, further comprising the steps of:
   determining whether the first adaptor was used prior to the request; and
   dynamically loading the first adaptor corresponding to the request if a determination is made by the determining that the first adaptor has not been used prior to the request.

3. The method according to claim 1, wherein the parameter is one of a plurality of parameters included in the request, and wherein the validating step includes determining that the request includes the plurality of parameters that are required for the first adaptor to publish a corresponding one of the plurality of notifications using the protocol corresponding to the first adaptor.

4. The method according to claim 1, further comprising the steps of:
   transmitting, to the publisher, identifiers of the plurality of adaptors, thereby enabling the publisher to invoke calls to the plurality of adaptors to communicate the plurality of notifications, respectively.

5. The method according to claim 1, wherein the request further includes a designation of the subscriber for the topic.

6. The method according to claim 1, wherein a plurality of subscriptions are associated with each of the plurality of adaptors.

7. A system for providing subscription notifications, comprising:
   at least one processor configured to perform as:
      a registrar operable to receive, from a subscriber, a request to register a subscription, the request including (i) an identifier of a topic, (ii) an identifier of a protocol corresponding to a first adaptor and supported by the subscriber, and (iii) a parameter associated with the protocol;

a plurality of adaptors, including the first adaptor,
the first adaptor being operable to validate the request to register the subscription based on the parameter, and
the plurality of adaptors corresponding to a plurality of protocols, respectively,
the plurality of adaptors being operable to publish, using the plurality of protocols, respectively, a plurality of notifications corresponding to a message to be published;

a notifier operable to:
store the subscription as subscription data, including the identifier of the topic, an identifier of the first adaptor, and the parameter, if a determination is made by the validating that the subscription data is valid,
wherein the subscription data is organized as a hierarchical data structure including a plurality of topics and sub-topics, each of the topics and sub-topics being associated with one or more subscribers and adaptors,
receive, from a publisher, the message to be published, the message including the identifier of the topic, and
identify, in the subscription data, a plurality of adaptors, including the first adaptor, to be used for the topic based on the identifier of the topic included in the message.

8. The system according to claim 7, wherein the registrar is further operable to determine whether the first adaptor was used prior to the request and cause the first adaptor corresponding to the request to be dynamically loaded if a determination is made that the first adaptor has not been used prior to the request.

9. The system according to claim 7, wherein the parameter is one of a plurality of parameters included in the request, and wherein the adaptor is further operable to validate the request by determining that the request includes the plurality of parameters that are required for the first adaptor to publish a corresponding one of the plurality of notifications using the protocol corresponding to the first adaptor.

10. The system according to claim 7, wherein the notifier is further operable to transmit, to the publisher, identifiers of the plurality of adaptors, thereby enabling the publisher to invoke calls to the plurality of adaptors to communicate the plurality of notifications, respectively.

11. The system according to claim 7, wherein the request further includes a designation of the subscriber for the topic.

12. The system according to claim 7, wherein a plurality of subscriptions are associated with each of the plurality of adaptors.

13. A non-transitory computer-readable medium having stored thereon instructions, which when executed by a computer system cause the computer system to perform:

receiving, by a registrar, a request from a subscriber to register a subscription, the request including (i) an identifier of a topic, (ii) an identifier of a protocol corresponding to a first adaptor and supported by the subscriber, and (iii) a parameter associated with the protocol;

validating, by the first adaptor, the request to register the subscription based on the parameter;

storing the subscription as subscription data, including the identifier of the topic, an identifier of the first adaptor, and the parameter, if a determination is made by the validating that the subscription data is valid, wherein the subscription data is organized as a hierarchical data structure including a plurality of topics and sub-topics, each of the topics and sub-topics being associated with one or more subscribers and adaptors;

receiving, from a publisher, a message to be published, the message including the identifier of the topic;

identifying, in the subscription data, a plurality of adaptors, including the first adaptor, to be used for the topic based on the identifier of the topic included in the message, wherein the plurality of adaptors corresponds to a plurality of protocols, respectively; and publishing, by the plurality of adaptors using the plurality of protocols, respectively, a plurality of notifications corresponding to the message.

14. The non-transitory computer-readable medium according to claim 13, further comprising instructions, which when executed by the computer system cause the computer system to perform:
determining whether the first adaptor was used prior to the request; and
dynamically loading the first adaptor corresponding to the request if a determination is made by the determining that the first adaptor has not been used prior to the request.

15. The non-transitory computer-readable medium according to claim 13, wherein the parameter is one of a plurality of parameters included in the request, and wherein the validating includes determining that the request includes the plurality of parameters that are required for the first adaptor to publish a corresponding one of the plurality of notifications using the protocol corresponding to the first adaptor.

16. The non-transitory computer-readable medium according to claim 13, further comprising instructions, which when executed by the computer system cause the computer system to perform:
transmitting, to the publisher, identifiers of the plurality of adaptors, thereby enabling the publisher, to invoke calls to the adaptor plurality of adaptors to communicate the plurality of notifications, respectively.

17. The non-transitory computer-readable medium according to claim 13, wherein the request further includes a designation of the subscriber for the topic.

18. The non-transitory computer-readable medium according to claim 13, wherein a plurality of subscriptions are associated with each of the plurality of adaptors.

* * * * *

UNITED STATES PATENT AND TRADEMARK OFFICE
CERTIFICATE OF CORRECTION

PATENT NO. : 8,832,304 B2  
APPLICATION NO. : 13/177882  
DATED : September 9, 2014  
INVENTOR(S) : Christopher J. Traynor Page 1 of 1

It is certified that error appears in the above-identified patent and that said Letters Patent is hereby corrected as shown below:

In the Specification

COLUMN 3

Line 20, "a SIP Servlet" should read --an SIP Servlet--.
  Line 46, "trie" should read --tree--.

COLUMN 4

Line 61, "particularly" should read --particular--.

COLUMN 6

Line 14, insert a --.-- after "determined".
  Line 51, "is" (first occurrence) should be deleted.

COLUMN 9

Line 42, "includes" should read --include--.
  Line 54, "above described" should read --above-described--.

Signed and Sealed this
Tenth Day of February, 2015

Michelle K. Lee
*Deputy Director of the United States Patent and Trademark Office*